United States Patent
Zednicek et al.

(10) Patent No.: US 7,280,343 B1
(45) Date of Patent: Oct. 9, 2007

(54) LOW PROFILE ELECTROLYTIC CAPACITOR ASSEMBLY

(75) Inventors: Stanislav Zednicek, Lanskroun (CZ); Leos Dvorak, Ceska Třebová (CZ); Radek Matousek, Moravska Trebova (CZ); Jiri Navratil, Lanskroun (CZ)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 11/590,651

(22) Filed: Oct. 31, 2006

(51) Int. Cl.
*H01G 5/38* (2006.01)
*H01G 4/228* (2006.01)
*H01G 9/00* (2006.01)

(52) U.S. Cl. ............... 361/541; 361/540; 29/25.03

(58) Field of Classification Search ........ 361/539–540, 361/533, 535, 523, 532, 528–529, 541; 29/25.03
See application file for complete search history.

(56) References Cited

U.S. PATENT DOCUMENTS

| | | | |
|---|---|---|---|
| 3,345,545 A * | 10/1967 | Bourgault et al. ........... | 361/529 |
| 4,085,435 A * | 4/1978 | Galvagni ..................... | 361/535 |
| 4,539,623 A | 9/1985 | Irikura et al. | |
| 4,945,452 A * | 7/1990 | Sturmer et al. ............. | 361/529 |
| 5,198,958 A * | 3/1993 | Krantz, Jr. .................. | 361/119 |
| 5,198,968 A | 3/1993 | Galvagni | |
| 5,357,399 A * | 10/1994 | Salisbury .................... | 361/529 |
| 5,394,295 A * | 2/1995 | Galvagni et al. ........... | 361/303 |
| 5,495,386 A * | 2/1996 | Kulkarni ..................... | 361/303 |
| 5,608,607 A * | 3/1997 | Dittmer ....................... | 361/686 |
| 5,888,590 A | 3/1999 | Gerber et al. | |
| 5,949,639 A * | 9/1999 | Maeda et al. ............... | 361/523 |
| 5,978,206 A | 11/1999 | Nishimura et al. | |
| 6,040,596 A | 3/2000 | Choi et al. | |
| 6,058,004 A | 5/2000 | Duva et al. | |
| 6,141,205 A | 10/2000 | Nutzman et al. | |
| 6,191,936 B1 * | 2/2001 | Webber et al. ............. | 361/528 |
| 6,197,252 B1 * | 3/2001 | Bishop et al. ............... | 419/36 |
| 6,229,688 B1 | 5/2001 | Kobayashi et al. | |
| 6,236,561 B1 | 5/2001 | Ogino et al. | |
| 6,278,356 B1 | 8/2001 | Lin et al. | |
| 6,285,542 B1 | 9/2001 | Kennedy, III et al. | |
| 6,322,912 B1 * | 11/2001 | Fife ............................ | 428/702 |
| 6,324,048 B1 | 11/2001 | Liu | |
| 6,400,557 B1 | 6/2002 | Watson et al. | |

(Continued)

FOREIGN PATENT DOCUMENTS

JP 2004281750 A * 10/2004

OTHER PUBLICATIONS

Abstract of Japanese Patent, JP2001338842, Dec. 7, 2001.

(Continued)

*Primary Examiner*—Eric W. Thomas
(74) *Attorney, Agent, or Firm*—Dority & Manning, P.A.

(57) ABSTRACT

An integrated capacitor assembly that offers improved performance characteristics in a convenient and space-saving package is provided. The capacitor assembly contains multiple discrete solid electrolytic capacitors that are "finished" in the sense that they are provided with leads and encapsulated. This allows each individual capacitor to be tested for performance prior to its incorporation into the capacitor assembly, thereby increasing the product yield and quality. More specifically, because each individual capacitor may be "pre-tested" and "aged", the likelihood that the final capacitor assembly will fail its performance test is minimal.

34 Claims, 5 Drawing Sheets

U.S. PATENT DOCUMENTS

| | | |
|---|---|---|
| 6,407,929 B1 | 6/2002 | Hale et al. |
| 6,461,170 B1 * | 10/2002 | Oliphant et al. ............ 439/76.1 |
| 6,473,291 B1 | 10/2002 | Stevenson |
| 6,496,375 B2 | 12/2002 | Patel et al. |
| 6,525,921 B1 | 2/2003 | Nakatani et al. |
| 6,616,713 B2 | 9/2003 | Sano et al. |
| 6,627,509 B2 | 9/2003 | Duva |
| 6,650,546 B2 | 11/2003 | Nelson et al. |
| 6,661,645 B1 * | 12/2003 | Sakai et al. ................. 361/523 |
| 6,665,190 B2 * | 12/2003 | Clayton et al. ............. 361/736 |
| 6,674,635 B1 * | 1/2004 | Fife et al. ................... 361/523 |
| 6,683,782 B2 | 1/2004 | Duva |
| 6,706,078 B2 * | 3/2004 | Nitoh et al. ................ 29/25.03 |
| 6,765,778 B1 | 7/2004 | Du et al. |
| 6,765,784 B2 | 7/2004 | Ohya et al. |
| 6,771,507 B1 | 8/2004 | Belady et al. |
| 6,790,725 B2 | 9/2004 | Coursey |
| 6,806,580 B2 | 10/2004 | Joshi et al. |
| 6,822,496 B2 | 11/2004 | Fukuda |
| 6,845,004 B2 | 1/2005 | Melody et al. |
| 7,016,179 B2 | 3/2006 | Ando |
| 7,057,878 B2 | 6/2006 | Vierow et al. |
| 7,084,608 B2 | 8/2006 | Lopata |
| 7,116,548 B2 | 10/2006 | Satterfield, Jr. et al. |
| 7,193,840 B2 | 3/2007 | Ohtsu |
| 2003/0174462 A1 * | 9/2003 | Wada et al. ................ 361/533 |
| 2005/0105250 A1 | 5/2005 | Kobayashi |
| 2005/0270725 A1 * | 12/2005 | Hahn et al. ................. 361/533 |
| 2006/0038304 A1 * | 2/2006 | Osako et al. ............... 257/789 |

OTHER PUBLICATIONS

Abstract of Japanese Patent, JP2002008941, Jan. 11, 2002.

Abstract of Japanese Patent, JP2002008944, Jan. 11, 2002.

Article - *Overcoming PCMCIA Power Limits in Modern Designs*, Pothier et al., Power Electronics Technology, May 2006, pp. 32-36.

Article - *The Evolution of Low ESR Double Layer Capacitors*, Reynolds et al., Battery Power Products & Technology, Mar. 2004, 2 pages.

Press Release - *Vishay's TANTAMOUNT® Conformal-Coated Solid Tantalum Capacitors Provide Industry- Best 3300-µF Capacitance in 2.5-mm-High Package*, Vishay Intertechnology, Inc., Oct. 19, 2005, 5 pages.

Product Information - Capacitor Array (IPC), AVX Corporation, 7 pages.

Product Information - Microwave SLCs (Multi-Cap Arrays), AVX Corporation, 2 pages.

Product Information - Capacitor Array (SMT Applications), AVX Corporation, 1 page.

Product Update: Resistors and capacitors, Electronic Products, Mar. 11, 2004, 11 pages.

* cited by examiner

LOW PROFILE ELECTROLYTIC CAPACITOR ASSEMBLY

BACKGROUND OF THE INVENTION

Portable computers and other electronic devices continue to be reduced in size as advances in technology reduce the size of components used to manufacture these devices. Along with this size reduction, compact slots have been provided in the devices for receiving integrated circuit ("IC") cards. In an effort to standardize IC card formats, the Personal Computer Memory Card International Association ("PCMCIA") has promulgated various standards governing the physical dimensions and interface configurations of IC cards (or PC cards). The PCMCIA standards set forth, among other things, IC card physical dimensions, electrical interface requirements between IC cards and the devices utilizing the IC cards, and a data format for the interchange of information between IC cards and devices utilizing IC cards. In addition to having 3 volt (130-150 mA) pins, PCMCIA slots (both standard size and "mini-PCMCIA" slots) may also have two 5-volt pins (each of which source 500 mA), which thereby limits the sourcing capability of the 5-volt pins to a total of 1 A at 5 volts.

Computer manufacturers have endorsed the PCMCIA standards and have included at least one slot for a PCMCIA card in virtually all laptop, sub-notebook and notebook computers. In response to the increasing popularity of the PCMCIA standards, numerous PCMCIA-compatible devices, such as hard drives, modems, local area network adaptors and wireless communication systems, have been developed. For example, one wireless communication card that serves the function of a wireless modem connectable to a cellular network is manufactured by Nokia under the product name "D211." Sierra Wireless and others produce similar devices, referred to herein generically as "cellular IC cards." Cellular functionality may also be integrated into combination cards that combine wireless LAN (WiFi) and cellular capability. Given these integration capabilities, the computer user may plug a card into his/her PC or laptop that provides wireless/cellular capability.

Unlike many applications that use PCMCIA or similar slots, however, cellular hardware can have very high peak current and/or power requirements that exceed the source capability of the PCMCIA slot for short periods of time. These peak current/power periods occur during transmit bursts or "pulses", when the cellular power amplifier (PA) transmits at power levels of over 2-3 W and draws more than the total of 1 A at 5 V available from the slot. For example, GSM/GPRS transmission requires a current of approximately 2A for the pulse duration, which exceeds the amount of pulsed current that can be supplied by the PCMCIA.

In an attempt to an on-demand temporary power source for use during these high-consumption periods, capacitors have been employed that are charged by a low current during the interval between pulses and supply the pulse current to the transmitter. High capacitance is, however, needed to minimize voltage drop to minimize the conductive and emitted electromagnetic interference and increase transmitter output power and efficiency. Supercapacitors (double layer capacitor), for instance, have been used for this purpose. However, supercapacitors tend to exhibit a high equivalent series resistance ("ESR"), which may result in a higher voltage drop compared to other solutions with high capacitance but lower ESR. In addition, supercapacitors are not assembled using the reflow process, which limits their usage in an automated manufacturing line and increases the need for manual operation and cost of the assembly. Individual capacitors (e.g., tantalum) have also been connected in parallel on the board. Nevertheless, this complicates the assembly process, requires higher overall footprint space, and may the electrical circuit more sensitive to the influence of PCB parasitic resistance and inductance.

As such, a need currently exists for a relatively simple and inexpensive capacitor system that is able to better satisfy industry requirements regarding size and performance.

SUMMARY OF THE INVENTION

In accordance with one embodiment of the present invention, a capacitor assembly is disclosed that comprises a plurality of discrete solid electrolytic capacitors arranged in the form of an array. The capacitors contain an encapsulated capacitor element that is electrically connected to an anode lead and a cathode lead. The capacitors have a thickness of about 4.0 millimeters or less. The assembly also comprises an anode termination that is electrically connected to the anode lead of the solid electrolytic capacitors and a cathode termination that is electrically connected to the cathode lead of the solid electrolytic capacitors. The solid electrolytic capacitors are encapsulated so that at least a portion of the anode and cathode terminations remain exposed for mounting to a surface.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIG. 1 is a cross-sectional view of electrolytic capacitors that may be employed in the present invention, in which

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to an integrated capacitor assembly that offers improved performance characteristics in a convenient and space-saving package. The capacitor assembly contains multiple discrete solid electrolytic capacitors that are "finished" in the sense that they are provided with leads and encapsulated. This allows each individual capacitor to be tested for performance prior to its incorporation into the capacitor assembly, thereby increasing the product yield and quality. More specifically, because each individual capacitor may be "pre-tested" and "aged", the likelihood that the final capacitor assembly will fail its performance test is minimal.

The individual solid electrolytic capacitors may be formed using any of a variety of techniques. For example, the capacitors typically contain an anode formed from a valve metal composition. The valve metal composition may have a high specific charge, such as about 60,000 microFarads*Volts per gram ("$\mu F*V/g$") or more, in some embodiments about 70,000 $\mu F*V/g$ or more, in some embodiments about 100,000 $\mu F*V/g$ or more, and in some embodiments, about 150,000 $\mu F*V/g$ or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the anode may be formed from a valve metal oxide having an atomic ratio of metal to oxygen of 1: less than 2.5, in some embodiments 1: less than 2.0, in some embodiments 1: less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

Conventional fabricating procedures may generally be utilized to form the anode. In one embodiment, a tantalum or niobium oxide powder having a certain particle size is first selected. The particle size may vary depending on the desired voltage of the resulting capacitor. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water; acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode subsequent to pressing and/or sintering of the anode.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; 5,495,386 to Kulkarni; and 6,322,912 to Fife, which are incorporated herein in their entirety by reference thereto for all purposes.

Regardless of the particular manner in which it is form, the thickness of the anode is selected in accordance with the present invention to improve the electrical performance of the capacitor assembly. For example, the thickness of the anode (in the -z direction in FIG. 1) of each individual capacitor typically ranges from about 4 millimeters or less, in some embodiments, from about 0.2 to about 3 millimeters, and in some embodiments, from about 0.4 to about 1 millimeter. Such a relatively small anode thickness (i.e., "low profile") helps dissipate heat generated by the high specific charge powder and also provide a shorter transmission path to minimize ESR and inductance. Furthermore, although the combined anode thickness of the capacitors may be equivalent to the anode thickness of a conventional single capacitor, the use of a small anode thickness for each individual capacitor allows for improved impregnation of the dielectric and solid electrolyte, thereby resulting in enhanced electrical performance.

The shape of the anode may also be selected to improve the electrical properties of the resulting capacitor assembly. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

The anode may be anodized so that a dielectric film is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode, a portion of the dielectric oxide film will also typically form on the surfaces of the pores. It should be understood that the dielectric film may be formed from other types of materials and using different techniques.

Once the dielectric film is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1 \times 10^5$ ohm-cm, and in some embodiments, greater than about $1 \times 10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming solid electrolytes, which acts as the true cathode of the capacitor. The electrolyte may be formed by pyrolytic decomposition of manganous nitrate ($Mn(NO_3)_2$) to form a manganese dioxide ($MnO_2$) cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the solid electrolyte. The conductive polymer coating may contain one or more conductive polymers, such as polypyrroles; polythiophenes, such as poly(3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene), may initially be mixed with a polymerization catalyst to form a solution. For example, one suitable polymerization catalyst is BAYTRON C, which is iron III toluene-sulphonate and n-butanol and sold by Bayer Corporation. BAYTRON C is a commercially available catalyst for BAYTRON M, which is 3,4-ethylene dioxythiophene, a PEDT monomer also sold by Bayer Corporation. In most embodiments, once applied, the conductive polymer is healed. Healing may occur after each application of a conductive polymer layer or may occur after the application of the entire conductive polymer coating. Although various methods have been described above, it should be understood that any other method for applying the electrolyte may also be utilized in the present invention.

Once the solid electrolyte is formed, the part may then be applied with a carbon coating (e.g., graphite) and silver coating, respectively. The silver coating may, for instance, act as a solderable conductor, contact layer, and/or charge collector for the capacitor element and the carbon coating may limit contact of the silver coating with the solid electrolyte.

Figure 1A:
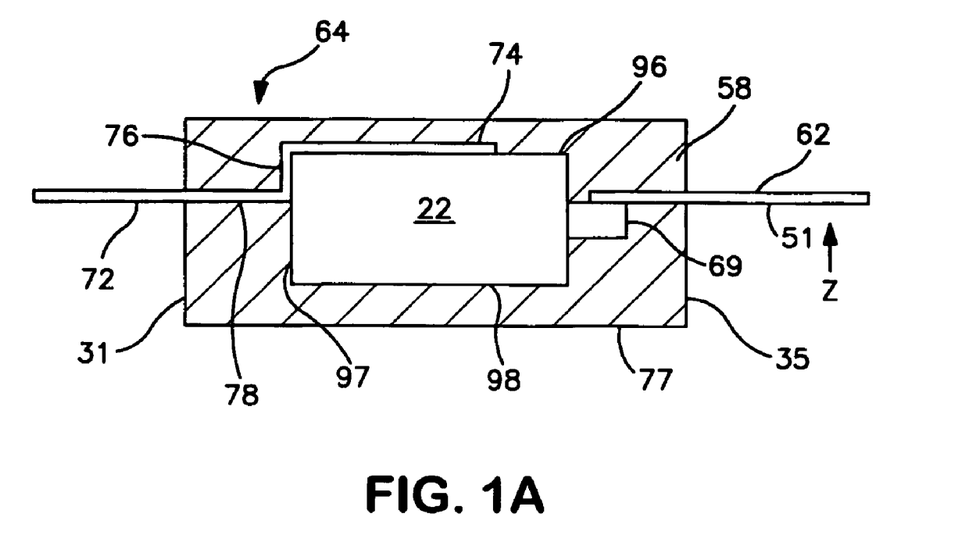
FIG. 1A shows the electrolytic capacitor with exposed portions of its anode and cathode leads in an unbent configuration and FIG. 1B shows the electrolytic capacitor with exposed portions of its anode and cathode leads bent into a J-shaped configuration.

Upon formation of the capacitor element, anode and cathode leads are electrically connected to the anode wire and the solid electrolyte, respectively. The specific configuration of the leads may vary as is well known in the art. Referring to FIG. 1A, for example, one embodiment of a capacitor 64 is shown that includes an anode lead 62 and a cathode lead 72. In this particular embodiment, the cathode lead 72 contains a first portion 74, second portion 76, and third portion 78. Although depicted as being integral, it should be understood that these portions may alternatively be separate pieces that are connected together, either directly or via an additional conductive element (e.g., metal). The first portion 74 is in electrical contact with an upper surface 96 of a capacitor element 22 and the second portion 76 is in electrical contact with a rear surface 97 of the capacitor element 22. As shown, the third portion 78 extends away from the capacitor element 22 and is provided in a plane that is substantially parallel to a bottom surface 98 of the capacitor element 22. The anode lead 62 contains a lower region 51 that is electrically connected to an anode wire 6a. If desired, the region 51 may also possess a "U-shape" for further enhancing surface contact and mechanical stability of the wire 6a. Similar to the cathode lead 72, the anode lead 62 may be provided in a plane that is substantially parallel to a bottom surface 98 of the capacitor element 22.

Figure 1B:
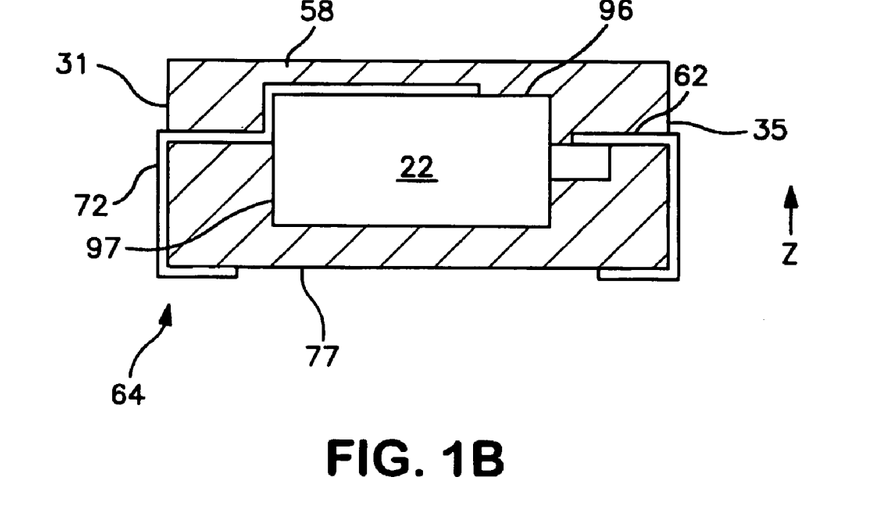

It should be understood that the particular lead configuration is not critical to the present invention, so long as at least a portion of the leads remains exposed for subsequent electrical connections as described below. For example, another embodiment of the capacitor 64 is shown in FIG. 1B in which the cathode lead 72 and the anode lead 62 are bent into a conventional J-shaped configuration. Namely, the third portion 72 of the cathode lead 72 is bent around the encapsulating case 58 (described below) so that it contacts both a rear surface 31 and a bottom surface 77 of the capacitor 64. Similarly, the anode lead 62 is also bent around the case 58 (described below) so that it contacts both a front surface 35 and the bottom surface 77 of the capacitor 64.

One embodiment of a technique for forming the electrolytic capacitor 64 of FIG. 1 will now be described in more detail. Initially, a lead frame (not shown) is provided to facilitate the manufacture of capacitors in bulk. As is known in the art, the lead frame may contain a plurality of rows and columns, each of which define the cathode lead 72 and anode lead 62. To attach the capacitor element 22 to the lead frame, a conductive adhesive may initially be applied to a surface of the cathode lead 72. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes. Any of a variety of techniques may be used to apply the conductive adhesive to the cathode lead 72.

Thereafter, the capacitor element 22 is positioned on the surface of the cathode lead 72 so that its bottom surface 98 contacts the adhesive. The anode wire 6a is then electrically connected to the lower region 51 of the anode lead 62 using any technique known in the art, such as mechanical welding, laser welding, conductive adhesives, etc. For example, the anode wire 6a may be welded to the anode lead 62 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode wire 6a to the anode lead 62, the conductive adhesive may then be cured. For example, a heat press may be used to apply heat and pressure to ensure that the capacitor element 22 is adequately adhered to the cathode lead 72 by the adhesive.

Once the capacitors are attached, the lead frame is enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.4 to about 2.5 millimeters, and in some embodiments, from about 0.5 to about 2.0 millimeters. Suitable casings may include, for instance, "F", "G", "H", "K", "P", "R", "S", "T", "W", "Y", or "X" cases (AVX Corporation). One particular embodiment of such an encapsulating case is shown in FIG. 1 as element 58. The encapsulating case 58 provides additional structural and thermal protection for the capacitor 64. After encapsulation, exposed portions of the respective anode and cathode leads 62 and 72 are aged, screened, and trimmed. As explained above, the exposed portions may be optionally bent along the outside of the casing 58 (e.g., at an approximately 90° angle) (FIG. 1B). In this manner, the exposed portions form J-shaped leads for the finished capacitor assembly, although any other known configuration may also be formed in accordance with the present invention. More desirably, however, the exposed portions may remain unbent to facilitate subsequent electrical connection and to minimize the height of the capacitor 64.

The properties of each individual capacitor may be controlled to optimize the performance of the resulting capacitor assembly. For instance, the capacitor may exhibit a low equivalent series resistance (ESR), which refers to the extent that the capacitor has resistance in series with capacitance, which delays charging and discharging and causes losses in electronic circuit. For example, the solid electrolytic capacitor may have an ESR of less than about 200 milliohms, in some embodiments less than about 100 milliohms, and in some embodiments, less than about 40 milliohms, measured with a 2-volt bias and 1-volt signal at a frequency of 100 kHz. The capacitance of each individual electrolytic capacitor may also range from about 0.1 to about 4,000 microFarads, in some embodiments, from about 10 to about 2,000 microFarads, in some embodiments, from about 100 to about 1,000 microFarads, measured at a frequency of 120 Hz.

Once formed, multiple "finished" electrolytic capacitors (e.g., 2 or more), such as described above, are mounted onto a lead frame and optionally encapsulated within a case to form an integral capacitor assembly. Any number of electrolytic capacitors may be employed, such as from 2 to 40 capacitors, in some embodiments, from 4 to 20 capacitors, and in some embodiments, from 6 to 16 capacitors. Regardless, the present inventors have discovered that the use of electrolytic capacitors that are "finished" (e.g., terminated and encapsulated) allows the electrical properties of each individual capacitor to be tested and aged prior to incorporation into the capacitor assembly. In this manner, a greater likelihood exists that the individual capacitors within the assembly will not fail during testing, thereby resulting in a higher yield for the end product.

Figure 2:
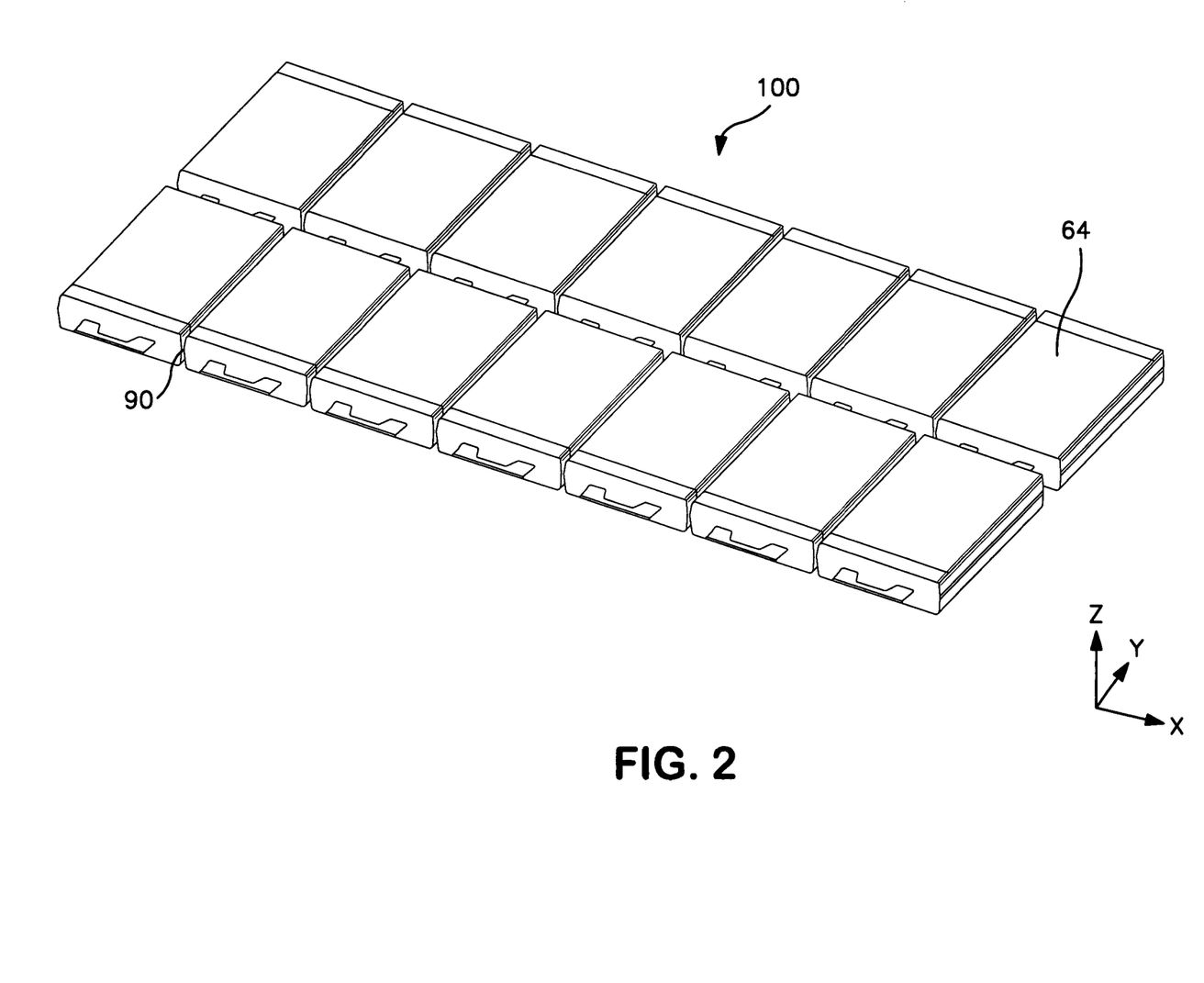
FIG. 2 is a perspective view of an array of fourteen (14) capacitors in accordance with one embodiment of the present invention.

To minimize the thickness of the assembly for "low profile" applications, the capacitors are also generally arranged in a one- or two-dimensional array. Referring to FIG. 2, for instance, an array 100 of fourteen (14) individual capacitors 64 is shown. In this particular embodiment, the array 100 includes two (2) rows and seven (7) columns of capacitors 64. The capacitors 64 in each row are aligned so that their side surfaces are positioned adjacent to each other to optimize the height of the assembly. That is, a surface 90 of each capacitor 64 defined by its width (-x direction) and length (-y direction) is placed adjacent to a corresponding surface of another capacitor. Alternatively, the capacitors 64 may be placed "end-to-end" so that the rear surface of one capacitor is positioned adjacent to either the front or rear surface of another capacitor. It should be understood that the capacitors 64 need not extend in the same direction. For example, the surface 90 of one capacitor 64 may be provided in a plane that is substantially perpendicular to the -x direction, while the surface 90 of another capacitor may be provided in a plane that is substantially perpendicular to the -y direction. Desirably, however, both the capacitors 64 extend in substantially the same direction.

To form an integrated capacitor assembly, the individual capacitors are electrically connected to common cathode and anode terminations. The terminations serve as a mounting surface for the capacitor assembly and also help to stabilize the individual capacitors against movement. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. One exemplary conductive material is a copper-iron alloy metal plate available from Wieland (Germany).

Figure 4:
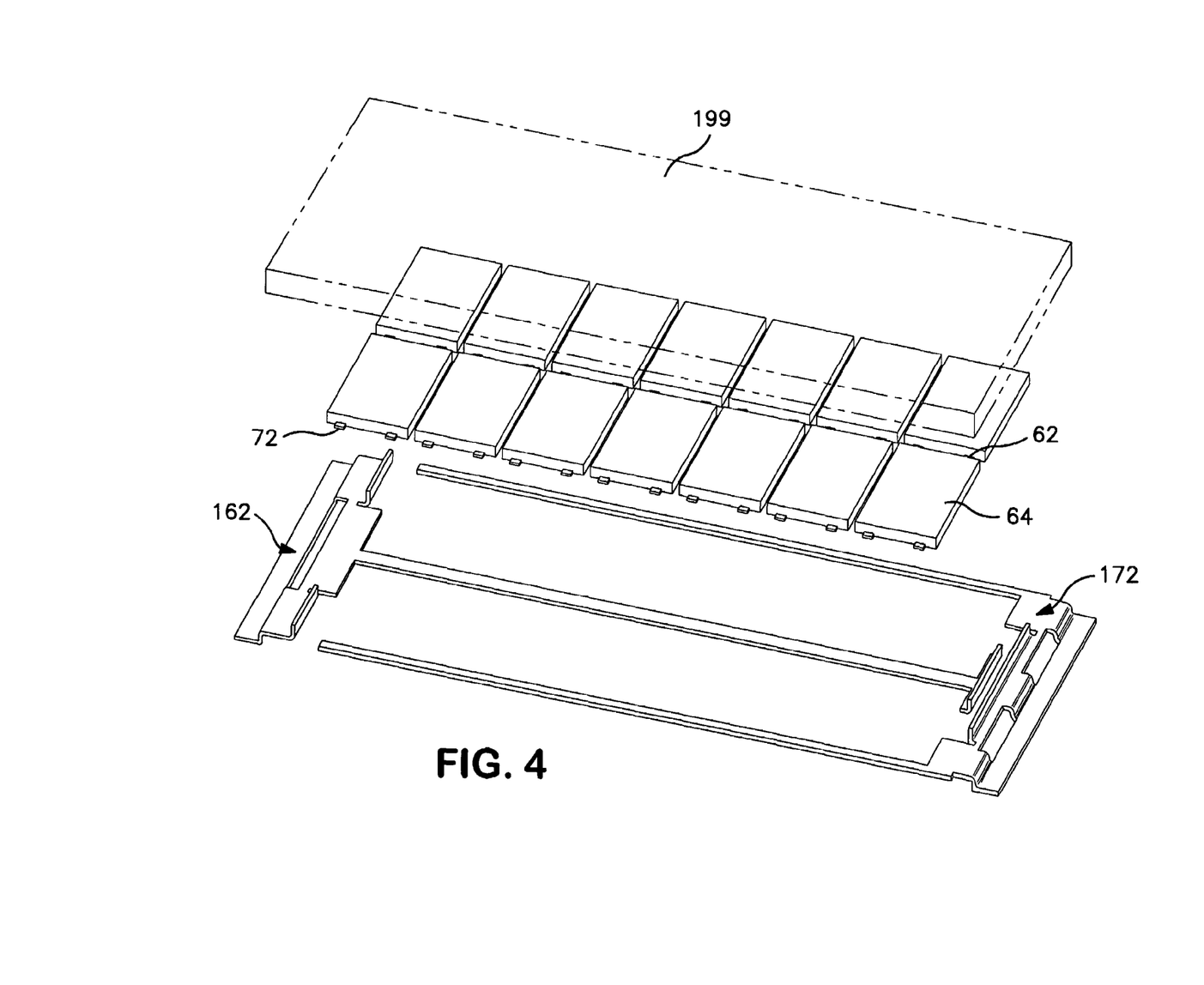
FIG. 4 is an illustration of one embodiment of a method for forming a capacitor assembly from the capacitor array of FIG. 2 and the terminations of FIG. 3.
Figure 5:
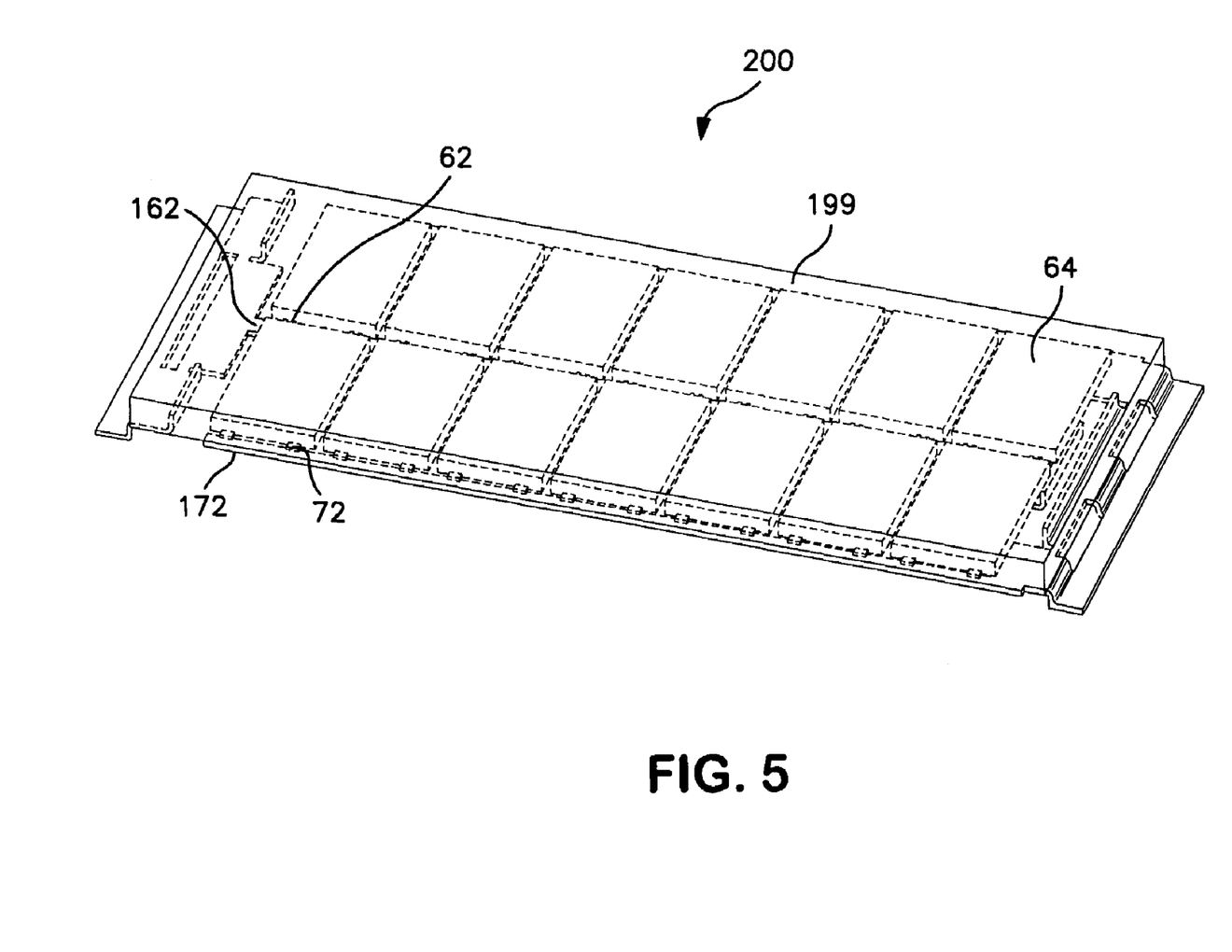
FIG. 5 is a perspective view of one embodiment of the capacitor assembly of the present invention.

The terminations may generally be arranged in any desired manner so that they are electrically isolated from each other and able to receive the individual capacitors. Referring to FIGS. 4-5, one embodiment of a capacitor assembly 200 is shown that includes individual capacitors 64 connected in parallel to common anode and cathode terminations 162 and 172, respectively. More specifically, the cathode termination 172 is electrically connected to the cathode leads 72 of the capacitors 64, while the anode termination is electrically connected to the anode leads 62 of the capacitors 64. The cathode leads 72 and anode leads 62 may be electrically connected to the terminations 172 and 162, respectively, using any known technique. For example, the leads may be connected to the terminations either directly (e.g., laser welded, conductive adhesive, etc.) or via an additional conductive element (e.g., metal). In one embodiment, for example, one or more surfaces of the terminations may be plated with a metal solder (e.g., tin,) or screen printed with solder paste or silver adhesive to facilitate the connections of the capacitors 64 to the terminations and/or to ensure that the final part is mountable to a surface.

Figure 3:
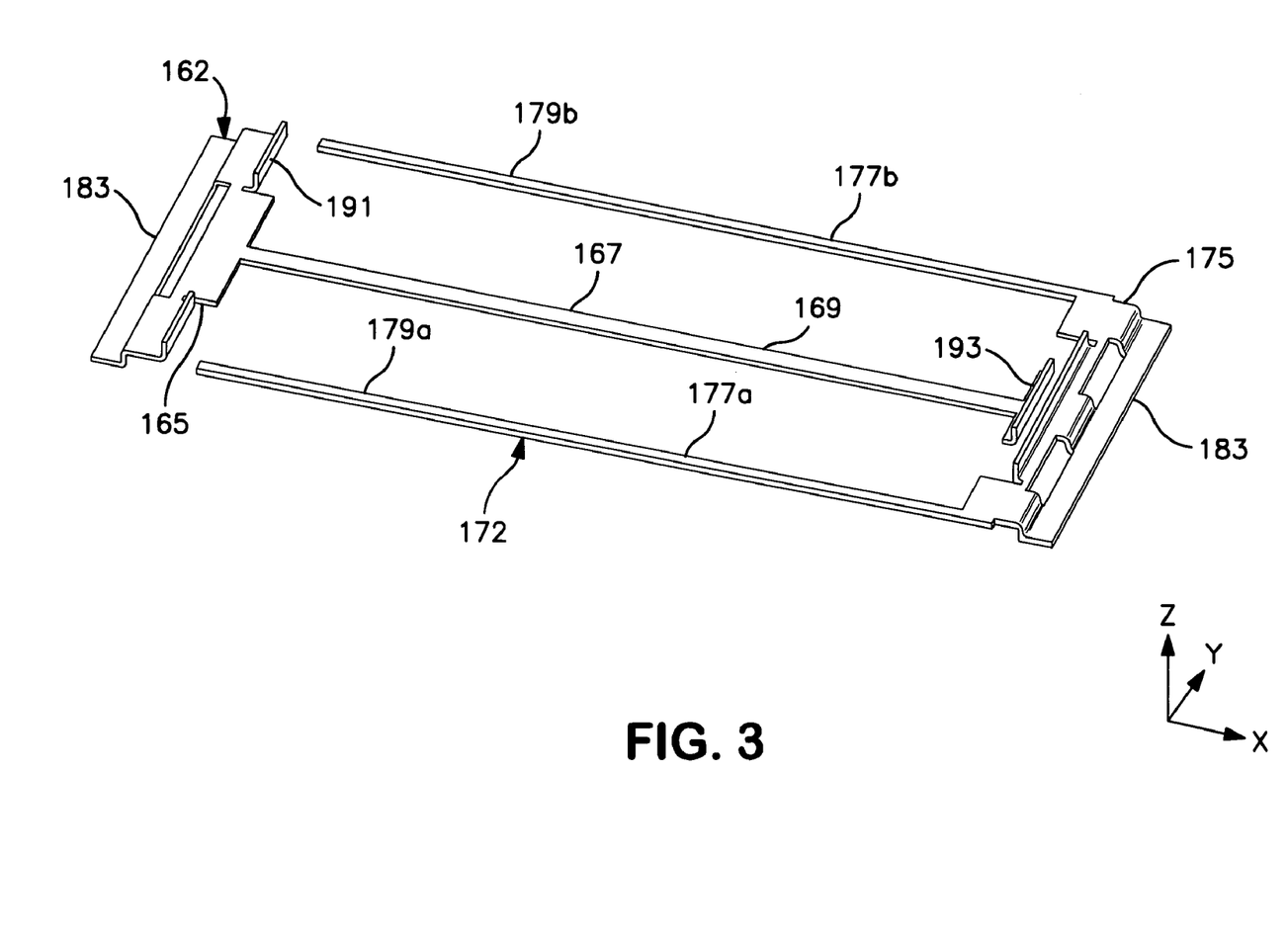
FIG. 3 is a perspective view of anode and cathode terminations that may be used in accordance with one embodiment of the present invention.

A lead frame that contains the cathode termination 172 and anode termination 162 is shown in more detail in FIG. 3. The cathode termination 172, for instance, includes branched portions 177a and 177b that extend from a base portion 175 in the -x direction. Each of the branched portions 177a and 177b define respective upper surfaces 179a and 179b. The upper surface 179a is capable of receiving the cathode leads 72 of one row of capacitors, while the upper surface 179b is capable of receiving the cathode leads from another row of capacitors. The anode termination 162 also includes a base portion 165 and a branched portion 167 that extends therefrom in the -x direction. The branched portion 167 defines an upper surface 169 that is capable of receiving the anode leads 62 of both rows of capacitors 64 (FIGS. 4-5). The branched portions 167, 177a, and 177b are generally flat and provided in a plane that is substantially parallel to the bottom surface 77 of the capacitors 64. Consequently, a bottom surface of the branched portions may be more readily mounted onto a surface in the desired application. Tabs 183 may also be included that extend in a direction away from the capacitors 64 to provide an additional mounting surface. Typically, the tabs 183 are substantially coplanar with the branched portions. The base portions 165 and 175, respectively, may also includes raised member 191 and 193, respectively, against which the capacitors 64 may rest to thereby provide improved stability and robustness to the assembly 200 (FIGS. 4-5).

Because the terminations 172 and 162 are not in direct contact, they generally remain in electrical isolation. Nevertheless, an encapsulating case may be optionally employed to provide electrical and thermal protection to the assembly, as well as additional structural support. One embodiment of such an encapsulating case is shown in FIGS. 4-5 as element 199. The thickness of the case is generally minimized so that the resulting capacitor assembly 200 has a low profile. For example, the thickness of the resulting assembly may be about 5 millimeters or less, in some embodiments from about 0.5 to about 4 millimeters, and in some embodiments, from about 0.8 to about 2.5 millimeters.

As a result of the present invention, a capacitor assembly may be formed that exhibits excellent electrical properties. For example, the assembly may achieve a high capacitance, such as from about 100 to about 50,000 µF, in some embodiments from about 2,000 to about 8,500 µF., and in some embodiments, from about 2,500 to about 7,000 µF., measured at a frequency of 120 Hz. The equivalent series resistance of the capacitor assembly may also be less than about 60 milliohms, in some embodiments less than about 50 milliohms, and in some embodiments, less than about 35 milliohms, measured with a 2-volt bias and 1-volt signal at a frequency of 100 kHz. It is also believed that the dissipation factor (DF) of the capacitor assembly may also be maintained at relatively low levels. The dissipation factor (DF) generally refers to losses that occur in the capacitor assembly and is usually expressed as a percentage of the ideal performance. For example, the dissipation factor of a capacitor assembly of the present invention is typically less than about 15%, and in some embodiments, less than about 5%, measured at a frequency of 120 Hz. The peak surge current may likewise be about 12.0 Amps or more, in some embodiments, about 13.0 Amps or more, and in some embodiments, from about 14.0 to about 30.0 Amps.

The capacitor assembly of the present invention may be employed in a wide variety of applications. Due to its low profile, for example, the capacitor assembly may be particularly useful in integrated circuit cards, such as PC cards. Currently, three standard PC card physical form factors existed as defined by the PCMCIA: (1) PCMCIA Type I having a thickness of 3.3 mm; (2) PCMCIA Type II having a thickness of 5.0 mm; and (3) PCMCIA Type III having a thickness of 10.5 mm. Various examples of such cards are described, for instance, in U.S. Pat. Nos. 6,665,190 to Clayton, et al.; 6,461,170 to Oliphant, et al.; 5,608,607 to Dittmer, which are incorporated herein in their entirety by reference thereto for all purposes. Such cards may have a variety of uses in modular peripherals in platforms, such as memory cards for computers (notebook, handheld, and palmtop), wireless modem cards, etc. Wireless modem cards, for example, are increasingly used in portable computer systems and devices to enable wireless communications in various system configurations and media such as digital cellular network, wireless personal communication services (PCS), wireless local loop, etc. These wireless modem cards typically conform to PCMCIA Type II form factor specifications which require a thickness of 5 mm or less. The capacitor assembly of the present invention may be particularly effective in such cards.

The present invention may be better understood by reference to the following examples.

Test Procedures

Equivalent Series Resistance (ESR), Capacitance, and Dissipation Factor:

Equivalence series resistance was measured using an Keithley 3330 Precision LCZ meter with Kelvin Leads with 0 volts bias and 1 volt signal. The operating frequency was 100 kHz. The capacitance and dissipation factor were measured using an Keithley 3330 Precision LCZ meter with Kelvin Leads with 0 volts bias and 1 volt signal. The operating frequency was 120 Hz and the temperature was 23° C.±2° C.

Leakage Current:

Leakage current ("DCL") was measured using a Keithley 2400 source meter. The Keithley 2400 measures leakage current at a temperature of 23° C.±2° C. and at a certain rated voltage after 5 minutes.

EXAMPLE 1

Capacitor assemblies were constructed in accordance with the present invention. Specifically, fourteen (14) TAJX330M4 tantalum capacitors (AVX Corp.) having a capacitance of about 330 µF (120 Hz) were provided. During manufacture of the capacitors, exposed portions of the anode and cathode leads were kept straight so that the lead configuration was as shown in FIG. 1A. The exposed portions of the anode lead were also trimmed to a length of about 0.4 mm and the cathode lead was trimmed to a length of about 0.4 mm. Further, the glue pad located on the bottom surface of the capacitor case was ground off to achieve a final capacitor thickness of 1.35 millimeters. The fourteen (14) capacitors were then connected in parallel to common anode and cathode terminations as described above and shown in FIGS. 2-5. Thereafter, the capacitors were encapsulated with a resin so that the resulting capacitor assembly had a length of about 37 mm, a width of about 17 mm, and a height of about 1.5 mm. Various electrical properties of one sample were tested. The results are set forth below in Table 1.

TABLE 1

Electrical Properties (Average of Measured Values)

| Parameter | Value |
| --- | --- |
| Capacitance (µF) | 4.69 |
| Dissipation Factor (%) | 4.82 |
| ESR (mΩ) | 10.3 |
| DCL (µA) | 21.4 |
| ESL (mH) | 92 |

As indicated, the capacitor assembly of the present invention exhibited excellent electrical properties.

EXAMPLE 2

Capacitor assemblies were constructed in accordance with the present invention. Specifically, six (6) TAJX330M4 tantalum capacitors (AVX Corp.) having a capacitance of about 330 µF (120 Hz) were prepared. During manufacture of the capacitors, exposed portions of the anode and cathode leads were kept straight so that the lead configuration was as shown in FIG. 1A. The exposed portions of the anode lead were also trimmed to a length of about 0.4 mm and the cathode lead was trimmed to a length of about 0.4 mm. Further, the glue pad located on the bottom surface of the capacitor case was ground off to achieve a final capacitor thickness of 1.35 millimeters. The capacitors were then connected in parallel to common anode and cathode terminations as described above and shown in FIGS. 2-5. Thereafter, the capacitors were encapsulated with a resin so that the resulting capacitor assembly had a length of about 20 mm, a width of about 17 mm, and a height of about 1.5 mm.

EXAMPLE 3

Capacitor assemblies were constructed in accordance with the present invention. Specifically, ten (10) TAJX330M4 tantalum capacitors (AVX Corp.) having a capacitance of about 330 µF (120 Hz) were prepared. During manufacture of the capacitors, exposed portions of the anode and cathode leads were kept straight so that the lead configuration was as shown in FIG. 1A. The exposed portions of the anode lead were also trimmed to a length of about 0.4 mm and the cathode lead was trimmed to a length of about 0.4 mm. Further, the glue pad located on the bottom surface of the capacitor case was ground off to achieve a final capacitor thickness of 1.35 millimeters. The capacitors were then connected in parallel to common anode and cathode terminations as described above and shown in FIGS. 2-5. Thereafter, the capacitors were encapsulated with a resin so that the resulting capacitor assembly had a length of about 28 mm, a width of about 17 mm, and a height of about 1.5 mm.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
a plurality of discrete solid electrolytic capacitors arranged in the form of an array, wherein the capacitors contain an encapsulated capacitor element that is electrically connected to an anode lead and a cathode lead, the capacitors having a thickness of about 4.0 millimeters or less;
an anode termination that is electrically connected to the anode lead of the solid electrolytic capacitors;
a cathode termination that is electrically connected to the cathode lead of the solid electrolytic capacitors; and
wherein the solid electrolytic capacitors are encapsulated so that at least a portion of the anode and cathode terminations remain exposed for mounting to a surface.

2. The capacitor assembly of claim 1, wherein the capacitor element contains an anode formed from a valve metal composition, a dielectric film overlying the anode, and a solid electrolyte overlying the dielectric film.

3. The capacitor assembly of claim 2, wherein the valve metal composition includes tantalum.

4. The capacitor assembly of claim 2, wherein the valve metal composition includes niobium oxide.

5. The capacitor assembly of claim 2, wherein the solid electrolyte contains manganese oxide.

6. The capacitor assembly of claim 2, wherein the solid electrolyte contains a conductive polymer.

7. The capacitor assembly of claim 1, wherein an exposed portion of the anode lead, the cathode lead, or both are provided in a plane that is substantially parallel to a bottom surface of the capacitor element.

8. The capacitor assembly of claim 1, wherein the anode lead, the cathode lead, or both are bent into a J-shaped configuration.

9. The capacitor assembly of claim 1, wherein the array includes 2 to 40 of the solid electrolytic capacitors.

10. The capacitor assembly of claim 1, wherein the array includes 6 to 16 of the solid electrolytic capacitors.

11. The capacitor assembly of claim 1, wherein the array defines multiple rows and columns of the solid electrolytic capacitors.

12. The capacitor assembly of claim 1, wherein the anode termination, the cathode termination, or both contains one or more branched portions extending from a base portion.

13. The capacitor assembly of claim 12, wherein the anode termination contains a branched anode portion extending from a base anode portion.

14. The capacitor assembly of claim 13, wherein the anode lead is electrically connected to the branched anode portion.

15. The capacitor assembly of claim 12, wherein the cathode termination contains a branched cathode portion extending from a base cathode portion.

16. The capacitor assembly of claim 15, wherein the cathode lead is electrically connected to the branched cathode portion.

17. The capacitor assembly of claim 1, wherein the capacitors have a thickness of from about 0.5 to about 2.0 millimeters.

18. The capacitor assembly of claim 1, wherein the assembly has a capacitance of from about 100 to about 50,000 µF, measured at a frequency of 120 Hz.

19. The capacitor assembly of claim 1, wherein the assembly has a capacitance of from about 2,500 to about 7,000 µF, measured at a frequency of 120 Hz.

20. The capacitor assembly of claim 1, wherein the assembly has a thickness of about 5 millimeters or less.

21. The capacitor assembly of claim 1, wherein the assembly has a thickness of about 0.8 to about 2.5 millimeters.

22. A PCMCIA card comprising the capacitor assembly of claim 1.

23. A method of forming a capacitor assembly, the method comprising:

providing a plurality of discrete solid electrolytic capacitors arranged in the form of an array, wherein the capacitors contain an encapsulated capacitor element that is electrically connected to an anode lead and a cathode lead;

providing a lead frame having a first surface and an opposing second surface, wherein the lead frame defines a cathode termination and an anode termination;

electrically connecting the anode lead to the first surface of the anode termination and the cathode lead to the first surface of the cathode termination; and encapsulating the capacitors so that at least a portion of the second surface of the anode termination and cathode termination remains exposed for mounting to a surface.

24. The method of claim 23, wherein the array includes 2 to 40 of the solid electrolytic capacitors.

25. The method of claim 23, wherein the array defines multiple rows and columns of the solid electrolytic capacitors.

26. The method of claim 23, wherein the lead frame contains one or more branched portions extending from a base portion.

27. The method of claim 26, wherein the anode termination contains a branched anode portion extending from a base anode portion.

28. The method of claim 27, wherein the anode lead is electrically connected to the branched anode portion.

29. The method of claim 26, wherein the cathode termination contains a branched cathode portion extending from a base cathode portion.

30. The method of claim 29, wherein the cathode lead is electrically connected to the branched cathode portion.

31. The method of claim 23, wherein the capacitors have a thickness of about 4 millimeters or less.

32. The method of claim 23, wherein the capacitors have a thickness of from about 0.5 to about 2.0 millimeters.

33. The method of claim 23, wherein the assembly has a thickness of about 5 millimeters or less.

34. The method of claim 23, wherein the assembly has a thickness of about 0.8 to about 2.5 millimeters.

* * * * *